US009804322B1

(12) United States Patent
Blessitt et al.

(10) Patent No.: US 9,804,322 B1
(45) Date of Patent: Oct. 31, 2017

(54) LINEAR EDGELIT LIGHTING SYSTEM WITH HEAT SINK BASE AND CLAMP COUPLED TOGETHER WITH A FASTENER

(71) Applicants: James Blessitt, Peachtree City, GA (US); Christopher Ladewig, Fayetteville, GA (US)

(72) Inventors: James Blessitt, Peachtree City, GA (US); Christopher Ladewig, Fayetteville, GA (US)

(73) Assignee: Cooper Technologies Company, Houston, TX (US)

( * ) Notice: Subject to any disclaimer, the term of this patent is extended or adjusted under 35 U.S.C. 154(b) by 41 days.

(21) Appl. No.: 14/885,878

(22) Filed: Oct. 16, 2015

Related U.S. Application Data

(60) Provisional application No. 62/066,589, filed on Oct. 21, 2014.

(51) Int. Cl.
F21V 8/00 (2006.01)

(52) U.S. Cl.
CPC ......... *G02B 6/0085* (2013.01); *G02B 6/0068* (2013.01); *G02B 6/0078* (2013.01); *G02B 6/0083* (2013.01); *G02B 6/0088* (2013.01)

(58) Field of Classification Search
CPC .. G02B 6/0066; G02B 6/0068; G02B 6/0073; G02B 6/0075; G02B 6/0078; G02B 6/0086; G02B 6/0091; G02B 6/0081; G02B 6/0088; G02B 6/0085; F21S 8/026
USPC .................................................. 362/63–634
See application file for complete search history.

(56) References Cited

U.S. PATENT DOCUMENTS

| D374,301 S | 10/1996 | Kleffman |
| D386,804 S | 11/1997 | Engel |
| 5,988,836 A | 11/1999 | Swarens |
| D477,891 S | 7/2003 | Fritze et al. |
| D496,121 S | 9/2004 | Santoro |
| D593,246 S | 5/2009 | Fowler et al. |

(Continued)

FOREIGN PATENT DOCUMENTS

| CN | 1371018 | 9/2002 |
| WO | WO 2012030387 | 3/2012 |

OTHER PUBLICATIONS

International Search Report for PCT/US2014/026500, dated Aug. 7, 2014.

(Continued)

*Primary Examiner* — Robert May
(74) *Attorney, Agent, or Firm* — King & Spalding LLP

(57) ABSTRACT

A lighting fixture includes a housing channel and a heat sink assembly coupled to the housing channel. The heat sink assembly includes a heat sink base and a heat sink clamp that are coupled together via a fastener to retain a waveguide to the lighting fixture. In particular, the fastener is disposed at an acute angle relative to the respective waveguide. Further, the lighting fixture includes one or more light sources coupled to the heat sink base and oriented such that light emitted by the one or more light sources enters an edge of the waveguide. Furthermore, the lighting fixture includes an end cap that covers an open lateral end of the housing channel. Further, the end cap operates as an alignment bracket to couple the lighting fixture to a second lighting fixture adjacent the open lateral end of the housing channel of the lighting fixture.

20 Claims, 14 Drawing Sheets

(56) References Cited

U.S. PATENT DOCUMENTS

| | | |
|---|---|---|
| D595,006 S | 6/2009 | Santoro |
| D604,000 S | 11/2009 | Fowler |
| D608,932 S | 1/2010 | Castelli |
| D633,247 S | 2/2011 | Kong et al. |
| D653,376 S | 1/2012 | Kong et al. |
| 8,128,256 B2 | 3/2012 | Kim et al. |
| D664,699 S | 7/2012 | Nakahira et al. |
| 8,232,724 B2 | 7/2012 | Mostoller et al. |
| D665,119 S | 8/2012 | Bryant |
| D667,983 S | 9/2012 | Pickard et al. |
| D672,079 S | 12/2012 | Kong et al. |
| D673,711 S | 1/2013 | Pickard et al. |
| D675,364 S | 1/2013 | Watt |
| D677,820 S | 3/2013 | Mayfield et al. |
| D678,597 S | 3/2013 | Lehman et al. |
| D681,872 S | 5/2013 | Kong et al. |
| D685,942 S | 7/2013 | Duquette et al. |
| D696,449 S | 12/2013 | Boyer et al. |
| D698,969 S | 2/2014 | Johns et al. |
| D698,973 S | 2/2014 | Santoro et al. |
| D698,975 S | 2/2014 | Blessitt et al. |
| D699,386 S | 2/2014 | Park et al. |
| D701,988 S | 4/2014 | Clements |
| D705,474 S | 5/2014 | Philips |
| D705,974 S | 5/2014 | Blessitt et al. |
| D707,873 S | 6/2014 | Boyer et al. |
| D714,988 S | 10/2014 | Park et al. |
| 9,046,225 B2 * | 6/2015 | Meyers ............... G02B 6/0011 |
| D735,391 S | 7/2015 | Blessitt |
| D739,977 S | 9/2015 | Boyer |
| 9,127,826 B2 | 9/2015 | Boyer |
| 9,182,534 B2 * | 11/2015 | Nakamura ........ G02F 1/133308 |
| 2008/0055534 A1 | 3/2008 | Kawano |
| 2009/0103327 A1 | 4/2009 | Iwasaki et al. |
| 2010/0165662 A1 | 7/2010 | Hamada |
| 2010/0271841 A1 | 10/2010 | Kim |
| 2011/0176306 A1 | 7/2011 | Kim et al. |
| 2012/0169967 A1 | 7/2012 | Han et al. |
| 2012/0182713 A1 | 7/2012 | Bretschneider |
| 2013/0051067 A1 | 2/2013 | Chen |
| 2013/0194820 A1 | 8/2013 | Pickard et al. |
| 2013/0208457 A1 | 8/2013 | Durkee et al. |
| 2013/0294053 A1 | 11/2013 | Marquardt et al. |
| 2013/0307420 A1 | 11/2013 | Yoder et al. |
| 2014/0036533 A1 | 2/2014 | Smith-Gillespie |
| 2014/0192558 A1 * | 7/2014 | Dau ..................... G02B 6/0073 362/612 |
| 2014/0198481 A1 | 7/2014 | Kim et al. |
| 2014/0268869 A1 | 9/2014 | Blessitt et al. |
| 2015/0049511 A1 * | 2/2015 | Tarsa ..................... G02B 6/305 362/612 |

OTHER PUBLICATIONS

Cooper Lighting, Skyridge 1×4, 1×2 PAR Graphic Documentation; Nov. 14, 2013.

* cited by examiner

LINEAR EDGELIT LIGHTING SYSTEM WITH HEAT SINK BASE AND CLAMP COUPLED TOGETHER WITH A FASTENER

CROSS REFERENCE TO RELATED APPLICATIONS

This application claims priority to U.S. Provisional Application No. 62/066,589, entitled 'Linkable Edgelit Lighting Strip,' and filed on Oct. 21, 2014, the entire contents of which are hereby incorporated herein by reference.

TECHNICAL FIELD

Embodiments of the invention relate generally to edgelit lighting fixtures, and in particular, to an edgelit lighting strip that can be linked to one or more other edgelit lighting strips.

BACKGROUND

Recent advancements in lighting technology have led to the replacement of traditional lighting sources with light emitting diodes (LEDs) in many lighting applications. LEDs hold several advantages over traditional lighting sources, such as increased power efficiency, size to output efficiency, lifespan, and so on. Thus, many lighting fixtures are being redesigned to use LEDs instead of the traditional lighting sources.

One type of LED lighting technology is edgelit lighting. Edgelit lighting solutions typically include a strip of LEDs and an acrylic lens or waveguide disposed adjacent the LED strip such that the LEDs emit light into the waveguide through an edge of the waveguide. The light then emanates from the surfaces of the waveguide. In some applications, the surfaces of the waveguide include etchings or other features to manipulate the light. Many rooms require lighting that extends linearly across a certain distance. Traditionally, fluorescent lighting elements have been used to provide such lighting. However, given the advantages of LED lighting, it would be beneficial to have an LED based linear lighting solution.

SUMMARY

In one aspect, the present disclosure can relate to a linear edgelit lighting device. The linear edgelit lighting device includes a housing channel. Further, the linear edgelit lighting device includes a heat sink assembly coupled to the housing channel. The heat sink assembly includes a heat sink base and a heat sink clamp that are coupled together to form a light source housing cavity and a waveguide housing cavity that are located substantially at a middle portion of the heat sink assembly. Furthermore, the linear edgelit lighting device includes a waveguide. The wave guide includes at least an edge and a plurality of surfaces. The edge is at least partially disposed in the waveguide housing cavity of the heat sink assembly such that the waveguide is substantially perpendicular to the housing channel and/or the heat sink assembly. Further, the linear edgelit lighting device includes one or more light emitting diodes (LEDs) disposed within the light source housing cavity of the heat sink assembly and directed towards the edge of the waveguide such that light emitted by the one or more LEDs enter the waveguide through the edge. The heat sink base and the heat sink clamp are coupled together by a fastener disposed at an acute angle relative to the waveguide and offset from the middle portion of the heat sink assembly. Further, the fastener is tightened to pull the heat sink clamp against the heat sink base and to exert an increased horizontal clamping force on the waveguide in order to securely retain the waveguide in the linear edgelit lighting device.

In another aspect, the present disclosure can relate to a lighting system. The lighting system includes a first lighting fixture. The first lighting fixture includes a first elongated housing channel having a pair of first open lateral ends. Each first open lateral end is opposite to each other and adjacent a respective lateral edge of the first housing channel. Further, the first lighting fixture includes a pair of first end caps where each first end cap is disposed at a respective first open lateral end to cover the respective first open lateral end. Furthermore, the first lighting fixture includes a first light emitting diode (LED) strip that is coupled to the first elongated housing channel. The first LED strip includes a plurality of LEDs. The first lighting fixture may also include a first waveguide that is coupled to the first elongated housing channel such that light emitted from the plurality of LEDs of the first LED strip enters the first waveguide through an edge of the first waveguide. Furthermore, the lighting system includes a second lighting fixture. The second lighting fixture includes a second housing channel having a pair of second open lateral ends, each second open lateral end being opposite to each other and adjacent a respective lateral edge of the second housing channel. The second lighting fixture includes a second light emitting diode (LED) strip coupled to the second elongated housing channel and comprising a plurality of LEDs; and a second waveguide coupled to the second elongated housing channel such that light emitted from the plurality of LEDs of the second LED strip enters the second waveguide through an edge of the second waveguide. The first lighting fixture is coupled to the second lighting fixture such that one first open lateral end of the first housing channel is adjacent one second open lateral end of the second housing channel. Further, at least one of the pair of first end caps is configured to operate as an alignment bracket to couple the first lighting fixture to the second lighting fixture such that a portion of the at least one of the pair of first end caps is coupled to the first housing channel and another portion of the at least one of the pair of first end caps is coupled to the second housing channel.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
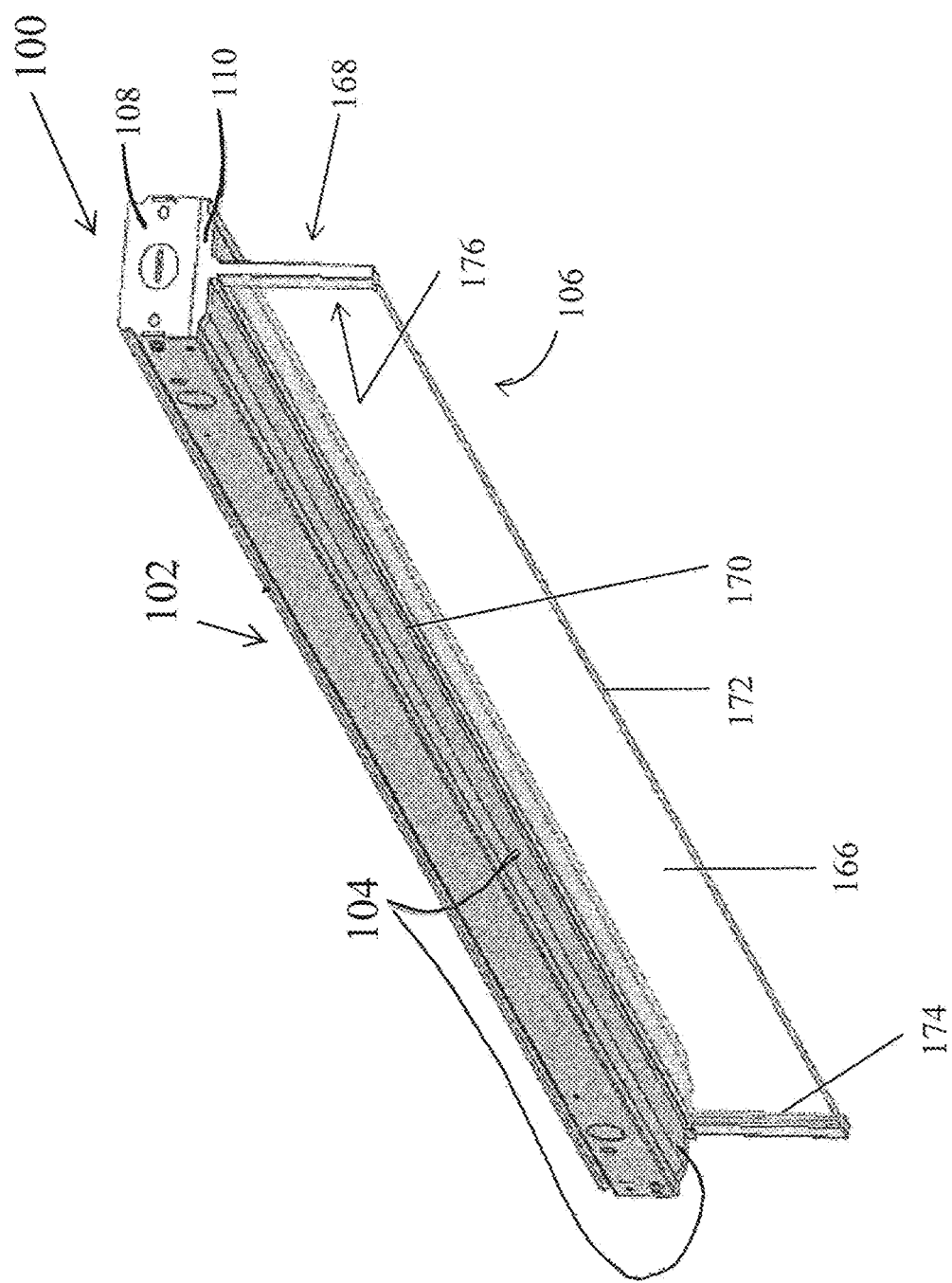
FIG. 1 illustrates a perspective view of a linear edgelit lighting fixture, in accordance with example embodiments of the present disclosure.

The drawings illustrate only example embodiments of the invention and are therefore not to be considered limiting of its scope, as the invention may admit to other equally effective embodiments. In the drawings, reference numerals designate like or corresponding, but not necessarily identical, elements.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

The technology of the present disclosure can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "exemplary embodiments" given herein are intended to be non-limiting and among others supported by representations of the present technology.

Figure 2:
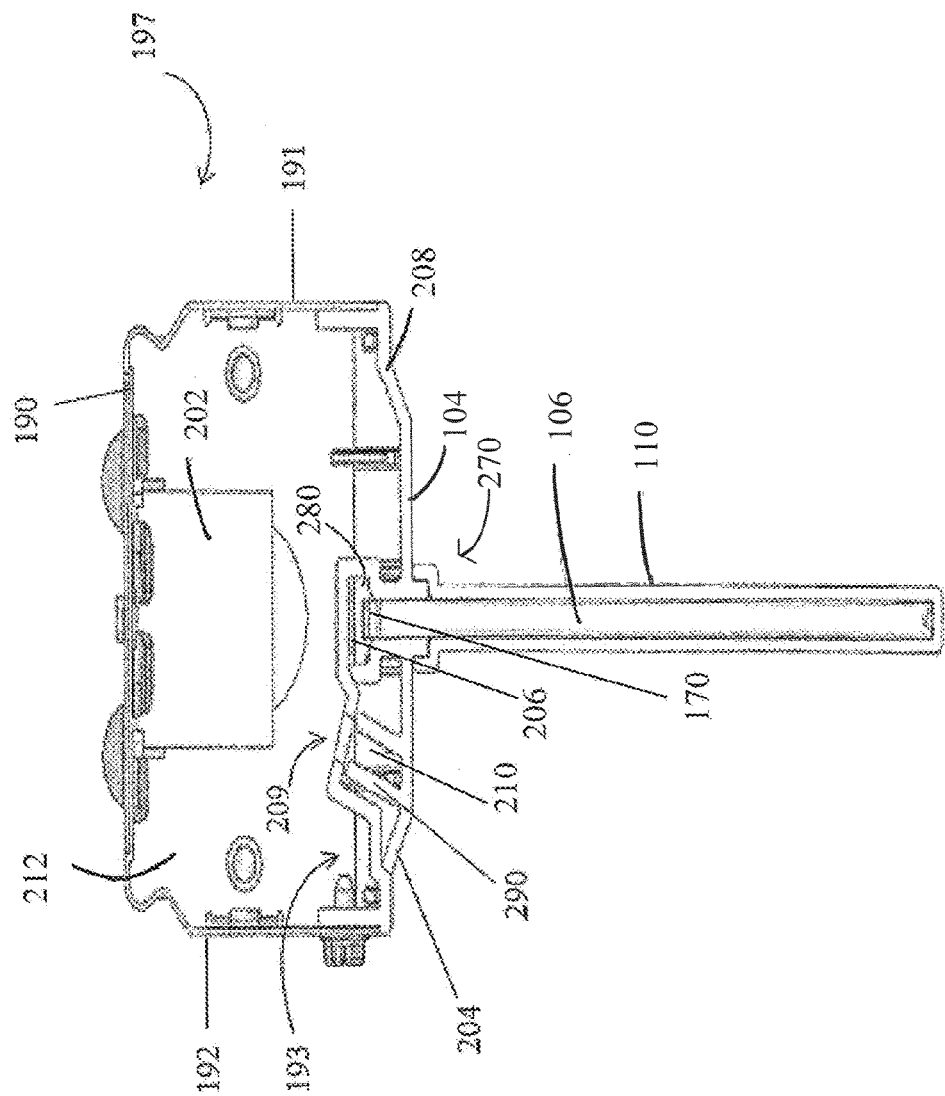
FIG. 2 illustrates a cross-sectional view of the linear edgelit lighting fixture of FIG. 1, in accordance with example embodiments of the present disclosure.

FIG. 1 illustrates a perspective view of a linear edgelit lighting fixture 100. FIG. 2 illustrates cross-sectional view of the linear edgelit lighting fixture 100, in accordance with example embodiments of the present disclosure. Referring to FIGS. 1 and 2, the linear edgelit lighting fixture 100 (hereinafter 'lighting fixture 100') includes a housing channel 102, a heat sink assembly 104, and an edgelit waveguide 106.

The housing channel 102 extends linearly and can be made in a variety of lengths (e.g., 2 feet, 4 feet, 8 feet, etc.). In particular, the housing channel 102 may be a U-shaped structure that includes a substantially rectangular base portion 190, and two side walls (191, 192), each extending substantially perpendicularly from respective opposite longitudinal edges of the base portion 190. Further, the housing channel 102 has an open side 193 between the two side walls (191, 192) and opposite the base portion 190. In addition, the housing channel 120 includes two open lateral ends adjacent the opposite lateral edges of the housing channel 102/base portion 190 of the housing channel 102 (one lateral open end 197 shown in FIG. 2).

In certain example embodiments, as illustrated in FIGS. 1, 3, 4, and 11, end caps 108 (also referred to as channel caps 108 interchangeably throughout this disclosure) may be disposed over the open lateral ends of the housing channel 102 such that they cover the open lateral ends. Even though the present disclosure describes the housing channel 102 as a U-shaped structure, one of ordinary skill in the art can understand and appreciate that the housing channel 102 may have any other geometric or non-geometric shape without departing from a broader scope of the present disclosure. For example, FIGS. 7-10 that will be described in greater detail below illustrates a lighting fixture that has another example housing channel structure.

In addition to the housing channel 102, the lighting fixture 100 includes a heat sink assembly 104. The heat sink assembly 104 extends along the length of the housing channel 102. In particular, the heat sink assembly 104 may be coupled to the side walls (191, 192) of the housing channel 102 along the open side 193 of the housing channel 102 opposite the base portion 190. In certain example embodiments, the heat sink assembly 104 may be a two-component construction; however, in other exemplary embodiments, the heat sink assembly 140 is constructed using fewer or greater components. As illustrated in FIG. 2, the heat sink assembly 104 includes a heat sink base 208 and a heat sink clamp 204. In certain example embodiments, the heat sink base 208 in combination with the heat sink clamp 204 couples the waveguide 106 to the housing channel 102. In particular, the heat sink clamp 204 attaches to the heat sink base 208 via a coupling region 210 and a fastener (e.g., screw, rivet, etc.) inserted therein (not shown). The heat sink clamp 204 includes a threaded portion 290 that is configured to receive the screw (not shown). The threaded portion 290 of the heat sink clamp 204 may be aligned with the coupling portion 209 (e.g., an aperture) of the heat sink base 208 to form the coupling region 210 that is configured to receive a fastener. The fastener may pass through the coupling portion 209 of the heat sink base 208 and enter the threaded portion 290 of the heat sink clamp 204 in order to couple the heat sink clamp 204 to the heat sink base 208. Further, the threaded portion 290 may be arranged at an angle, such that when the waveguide 106 is coupled to the housing channel 102, the fastener that couples the heat sink clamp 204 to the heat sink base 208 may rest at an acute angle with respect to the waveguide 106 offset from a mid-portion of the heat sink assembly 104.

Further, the heat sink assembly 104 may include an LED housing cavity 280 and a waveguide housing cavity 270 that extend substantially the length of the housing channel 102 approximately along a middle portion of the heat sink assembly 104. In particular, the LED housing cavity 280 and the waveguide housing cavity 270 are formed by coupling the heat sink clamp 204 to the heat sink base 208 using the fastener as described above. In certain exemplary embodiments, the LED housing cavity 280 has a greater width than the waveguide housing cavity 270. However, in other exemplary embodiments, the width of the LED housing cavity 280 is not greater than the width of the waveguide housing cavity 270. The LED housing cavity 280 is configured to receive one or more LED modules, e.g., LED strips 206 comprising a plurality of LEDs, while the waveguide housing cavity 270 is configured to receive a portion of the waveguide 106. Further, once a portion of the waveguide 106 is positioned within the waveguide housing cavity 270, the fastener may be tightened into the threaded portion 290 of the heat sink clamp 204 to pull the heat sink clamp 204 against the heat sink base 208 and exert a horizontal clamping force, due to the acute angle, onto the waveguide 106. The acute angle of the fastener provides improved retention of the waveguide 106.

The waveguide 106 is substantially rectangular shaped and includes a first surface 166, a second surface 168 facing a direction opposite the first surface 166, a first longitudinal edge 170, a second longitudinal edge 172 positioned opposite the first longitudinal edge 170, a first latitudinal edge 174 disposed between the first surface 166 and the second surface 168 and between the first longitudinal edge 170 and the second longitudinal edge 172, and a second latitudinal edge 176 positioned opposite the first latitudinal edge 174 and disposed between the first surface 166 and the second surface 168 and between the first longitudinal edge 170 and the second longitudinal edge 172. Alternatively, the waveguide 106 is formed in a different shape that is either geometric or non-geometric in other exemplary embodiments. The waveguide 106 is fabricated from an acrylic material and is substantially clear or translucent. Alternatively, the waveguide 106 is formed using other suitable materials, such as glass, and can be, or made to be, opaque, if desired. At least one of the first surface 166 and the second surface 168 includes features formed into the surfaces 166, 168. According to certain example embodiments, both surfaces 166, 168 include these features. The features are etchings formed into the surfaces 166, 168. The features are indentations formed using dimples, lasers, or are molded therein. These features facilitate in bringing the light present within the waveguide 106 outside of the waveguide 106.

In certain example embodiments, the LED strip 206 is disposed in the LED housing cavity of the heat sink assembly 104 and coupled to the heat sink base 208 in such a way that the LEDs of the LED strip 206 are directed towards an edge (e.g., first longitudinal edge 170) of the waveguide 106 retained in the waveguide housing cavity 270. During operation of the light fixture 100, the light emitted from the LEDs of the LED strip 206 enters the waveguide 106 through the first longitudinal edge 170 and is directed towards the second longitudinal edge 172 that faces the area to be illuminated. However, the features, as mentioned above, facilitate removal of the light from within the waveguide 165 through first and/or second surfaces (166, 168) of the waveguide 106. The light emitted through the surfaces (166, 168) of the waveguide may be reflected towards an area to be illuminated using one or more reflectors 302 (shown in FIG. 3). Alternatively, in some example embodiments, light may also be emitted through the second longitudinal edge 172 that faces the area to be illuminated. In other embodiments, a cover may be disposed over the second longitudinal edge 172. Further, during operation of the light fixture 100, the LED strip 206 may receive power from an LED driver 202 that is disposed in an enclosed hollow cavity 212 formed by the housing channel 102, the channel caps 108, and the heat sink assembly 104, as illustrated in FIG. 2.

In certain example embodiments, the light fixture 100 includes a waveguide cap 110 that covers the lateral ends/latitudinal edges (174, 176) of the waveguide 106. In particular, the waveguide cap 110 may include a top portion and a bottom portion. The top portion may be shaped substantially similar to the shape of the heat sink assembly 104 such that it covers the heat sink assembly 104. Further, the bottom portion of the waveguide cap 110 may be shaped substantially similar to the shape of the latitudinal edges of the waveguide such that it covers the lateral ends/latitudinal edges (174, 176) of the waveguide 106.

In certain example embodiments, the light fixture 100 is configured such that it can be attached end to end with other linear edgelit lighting fixtures 100, for example at either lateral ends (197) of the light fixture 100. In said example embodiment where the light fixture 100 is attached to other linear edgelit lighting fixtures 100, the channel cap 108 and/or the waveguide cap 110 of the light fixture 100 may be removed.

Figure 3:
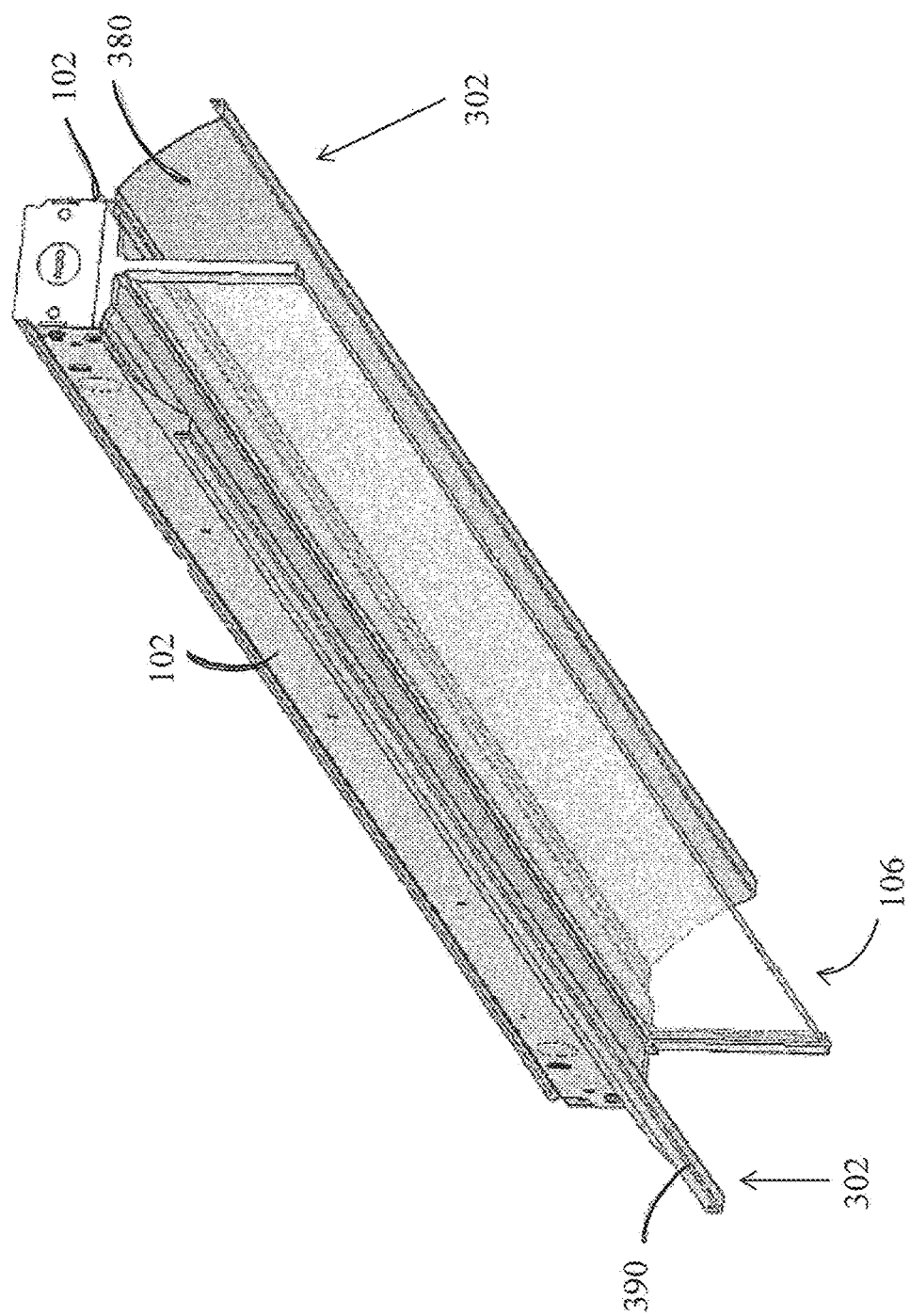
FIG. 3 illustrates a perspective view of the example of a linear edgelit lighting fixture of FIG. 1 with reflectors, in accordance with example embodiments of the present disclosure.

Turning to FIG. 3, this figure illustrates a perspective view of the linear edgelit lighting fixture of FIG. 1 with reflectors 302, in accordance with example embodiments of the present disclosure. In certain example embodiments, each light fixture 300 may have one or more reflectors 302. For example, as illustrated in FIG. 3, the light fixture 300 may have two reflectors, one reflector 302 on either side of the housing channel 102 coupled to a bottom portion of the side walls (191, 192) of the housing channel 102 or to the heat sink 104 such that they extend at least partially around the waveguide 106, i.e., facing the respective surfaces 166, 168 of the waveguide 106.

Each reflector 302 may include a reflector interior surface 380 facing one of the surfaces (166, 168) of the waveguide 106 and a reflector exterior surface 390 facing away from the surfaces (166, 168) of the waveguide 106. According to certain exemplary embodiments, the reflector interior surface 380 is fabricated using a reflective material or is fabricated using a non-reflective material and subsequently made to be reflective. For example, the reflector interior surface 380 is polished according to some exemplary embodiments or is painted to be made reflective. In particular, as described above, each reflector 302 is oriented with the reflector interior surface 380 facing downwards and towards the surface 166 or 168 of the waveguide. Hence, at least a portion of the light emitted from the surfaces 166, 168 of the waveguide 106 is directed towards the reflector interior surface 380 which in turn is reflected downwardly to a desired area to be lit, for example, a room or a hallway. In certain example embodiments, the reflector 302 is curved shaped, while in other embodiments; the reflector 302 is substantially planar, or flat-paneled. The shape of the reflector 302 and the features in the waveguide 106 may produce the desired light output.

Figure 4:
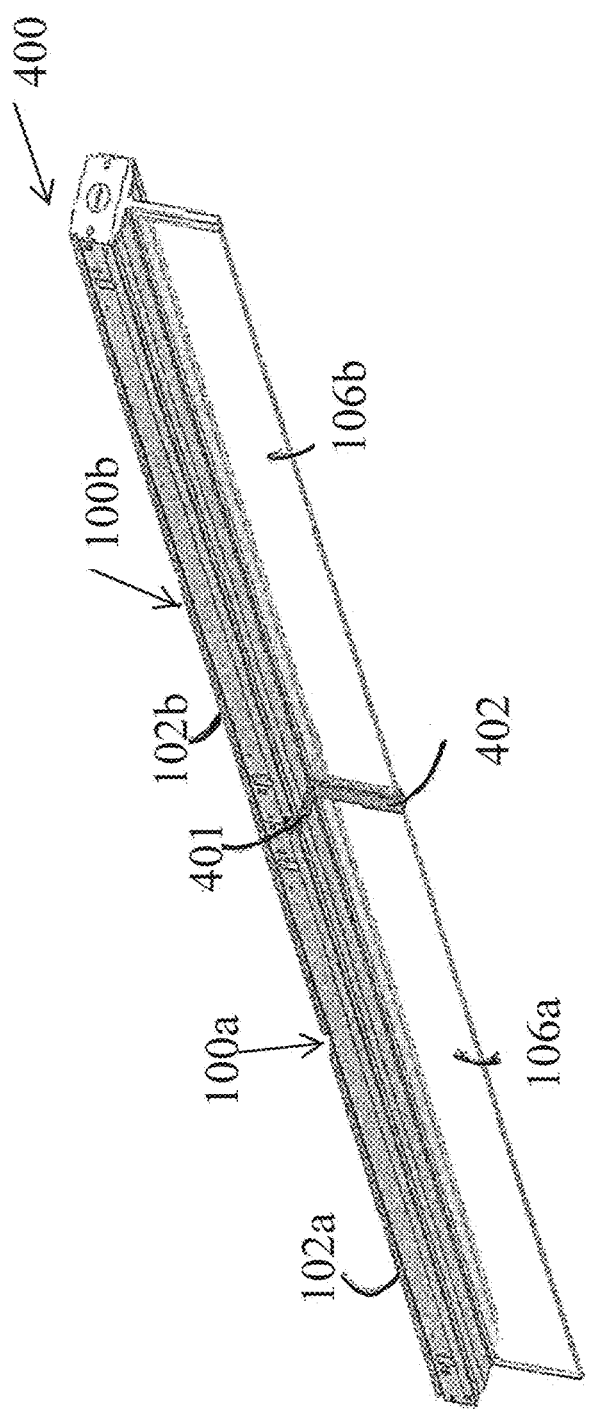
FIG. 4 illustrates a perspective view of two linear edgelit lighting fixtures linked together, in accordance with example embodiments of the present disclosure.

FIG. 4 illustrates a perspective view of two linear edgelit lighting fixtures 100a, 100b linked together in an assembly 400, in accordance with example embodiments of the present disclosure. The housing channels 102a, 102b of the respective light fixtures 100a, 100b are joined together at their lateral ends, i.e., the open lateral ends (e.g., open lateral end 197) that are configured to receive the channel caps 108. In certain example embodiments, a bridge 401 and waveguide spacer 402 are disposed at the junction of the two waveguides 106a, 106b. In particular, the bridge 401 may be shaped substantially similar to the shape of the heat sink assembly 104 such that the bridge 401 receives and overlaps the heat sink assembly 104 of the first light fixture 100a on one side and the heat sink assembly 104 of the second light fixture 100b on an opposite side of the bridge 401. The bridge 401 is configured to bridge/cover the gap between the heat sink assemblies when the first lighting fixture 100a is coupled to the second lighting fixture 100b at their lateral ends. Further, the waveguide spacer 402 may be shaped substantially similar to the shape of the latitudinal edges of the waveguide 106 and is configured to overlap the respective edges of the two waveguides 106a, 106b. That is, the waveguide spacer 402 may be configured to receive and secure a latitudinal edge 176, 178 of a first waveguide 106*a* on a first side of the waveguide spacer 402 and receive and secure a latitudinal edge 176, 178 of the second waveguide 106*b* on a second side of the waveguide spacer 402, to join and align the waveguides 106*a*, 106*b* together and cover a gap formed between the waveguides 106*a*, 106*b* when the first light fixture 100*a* is coupled to the second light fixture 100*b*. Furthermore, the bridge 401 and/or the waveguide spacer 402 may be fully opaque, partially opaque, or clear. In certain example embodiments, the bridge 401 and/or the waveguide spacer 402 may be formed using polymer material; however, in other example embodiments, any other appropriate material may be used without departing from a broader scope of the present disclosure.

Figure 5:
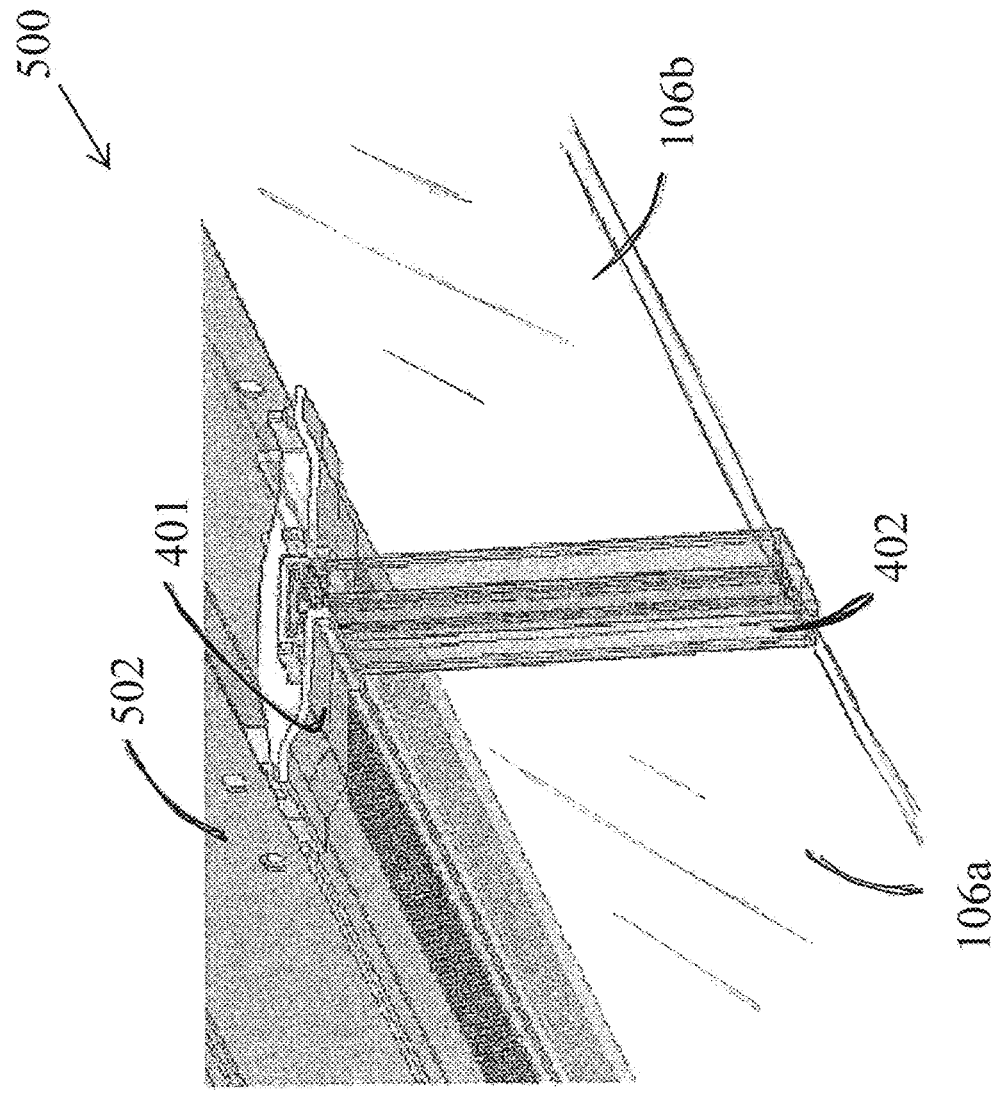
FIG. 5 illustrates a linear edgelit lighting fixture that includes two waveguides joined together in one housing channel of the linear edgelit lighting fixture, in accordance with example embodiments of the present disclosure.

Further, FIG. 5 illustrates a linear edgelit lighting fixture 500 with one integral housing channel 502 and two waveguides 106*a*, 106*b* joined together, in accordance with example embodiments of the present disclosure. The two waveguides 106*a*, 106*b* are both coupled to the same housing channel 502 which extends across the combined length of the two waveguides 106*a*, 106*b*. In such an example embodiment, the linear edgelit lighting fixture 500 includes a bridge 401 and a waveguide spacer 402 that link the two waveguides 106*a*, 106*b* together.

Turning to FIG. 6, this figure illustrates the steps of linking two linear edgelit lighting fixtures 100*a*, 100*b* in accordance with example embodiments of the present disclosure. Referring to FIGS. 6A-6D, a housing channel 102 of the first lighting fixture 100*a* may include one or more aligner slots 604, alignment apertures 603, and coupling apertures 608 located on the base portion 190 of the housing channel 102. In particular, as illustrated in FIG. 6A, the housing channel 102 may include two aligner slots 604 that may be located close to the open lateral end 601 of the first lighting fixture 100*a*. Further, the alignment aperture 603 and the coupling aperture 608 may also be located at a close proximity of the open lateral end 601. The aligner slots 604 may be parallel to each other, and spaced apart from each other, as illustrated in FIG. 6A.

Figure 6A:
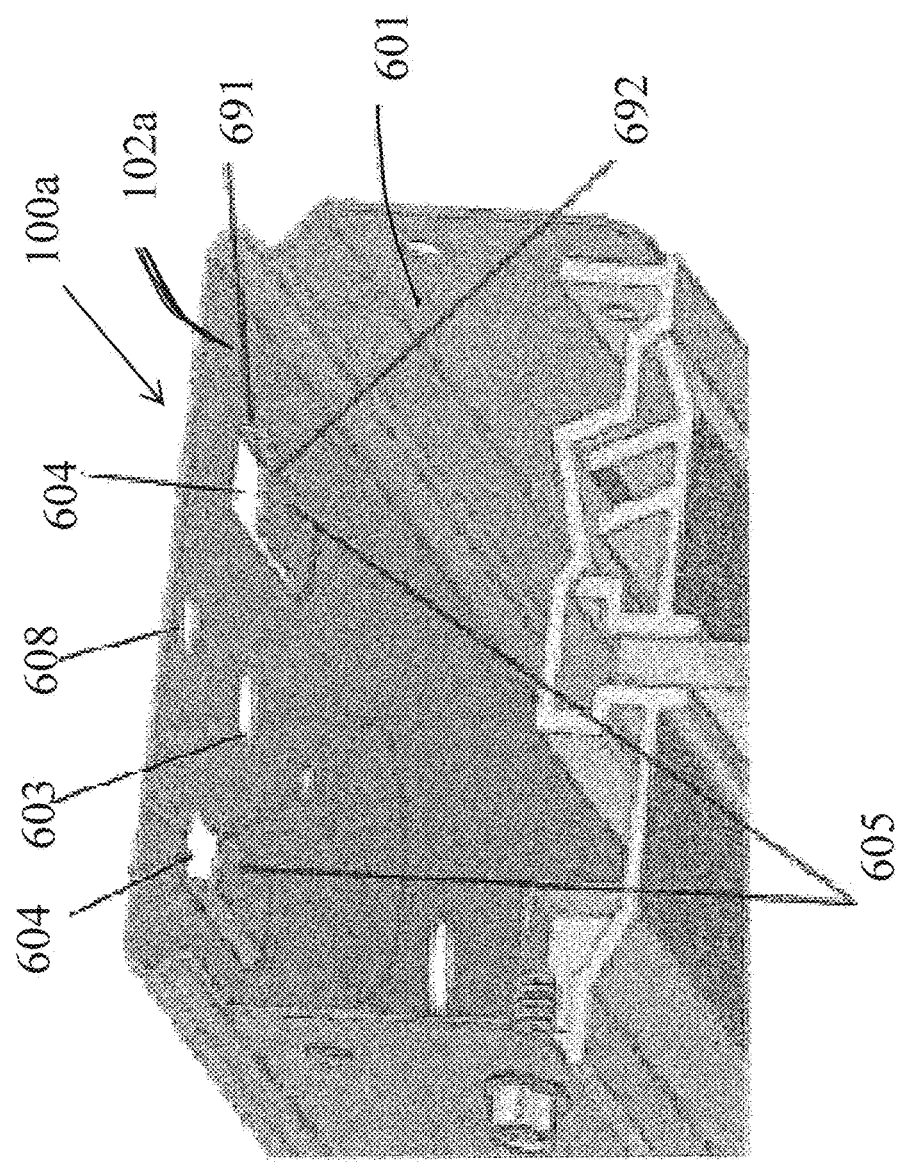
FIGS. 6A-6D (collectively 'FIG. 6') illustrate steps involved in linking together two linear edgelit lighting fixtures, in accordance with example embodiments of the present disclosure.

Furthermore, a substantially L-shaped flange 605 which extends substantially perpendicular to the base portion 190 of the housing channel 102 may be located adjacent each aligner slot 604 (e.g., extends from an edge of the aligner slot 604), as illustrated in FIG. 6A. The substantially L-shaped flanges 605 may extend is a direction towards the open side 193 (or towards heat sink assembly 104) of the housing channel 102 and may be configured to face each other. In an example embodiment, each substantially L-shaped flange 605 may include (i) a first leg 691 that is perpendicular to the base portion 190 of the housing channel 102*a* and (ii) a second leg 692 that extends from an end of the first leg 691 and is substantially perpendicular to the first leg 691 and parallel to the base portion 190. However, one of ordinary skill in the art can understand and appreciate that the housing channel may have flanges of any other appropriate shape without departing from a broader scope of the present disclosure. For example, the flange 605 may have a curved or hook-like shape. In particular, the L-shaped flanges 605 may be configured to receive and support an aligner bracket 602.

Figure 6B:
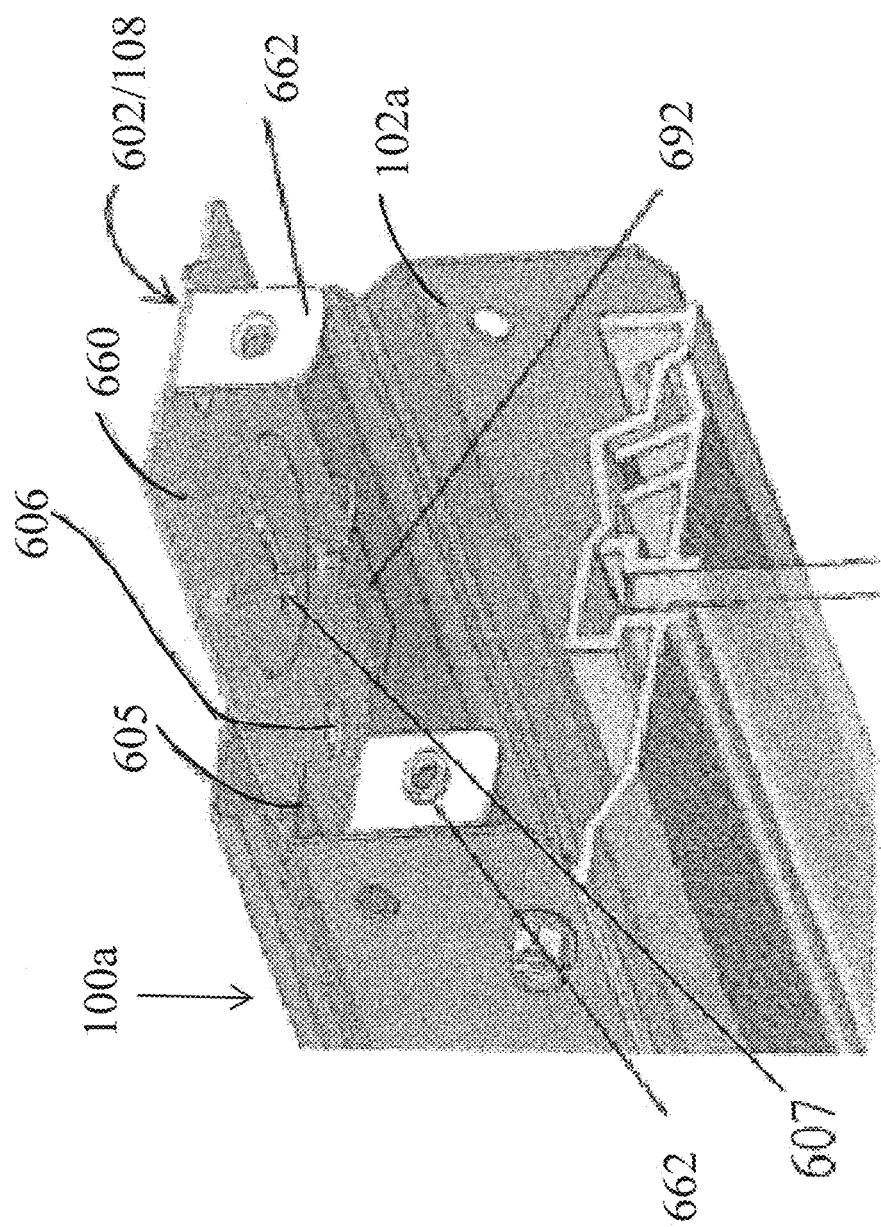

As illustrated in FIG. 6B, the aligner bracket 602 may include a substantially rectangular shaped top plate 660, and a flange 662 extending substantially perpendicularly from a mid-portion of either lateral ends of the top plate 660. Further, the top plate 660 of the aligner bracket 602 may have an elongated slot or aperture 607, and one or more alignment features 606 (such as a formed dimple, embossed dip, etc.), each adjacent to the opposite flanges 662. Furthermore, each flange 662 may include one or more apertures (or screw bosses), as illustrated in FIG. 6B. One of ordinary skill in the art can understand and appreciate that the above-described shape of the aligner bracket 602 is an example and is not limiting. That is, the aligner bracket 602 can have any other appropriate shape without departing from a broader scope of the present disclosure.

To couple the aligner bracket 602 to the housing channel 102*a*, a portion of the aligner bracket 602 (e.g., longitudinal edges and a corresponding portion of the aligner bracket 602) may be inserted into the L-shaped flanges 605 such that when fully inserted, the alignment feature 606 (e.g., embossed dip, formed dimple, etc.) of the aligner bracket 602 engages the alignment aperture 603 of the housing channel's base portion 190 to align and lock the aligner bracket 602 in place. Further, when the aligner bracket 602 is locked in place, the coupling aperture 607 of the aligner bracket 602 may be aligned with the coupling aperture 608 of the housing channel 102*a*. In particular, the second leg of the L-shaped flanges 605 that is substantially parallel to the base portion 190 of the housing channel 102*a* receives and supports the top plate 660 of the aligner bracket 602. Once the top plate 660 of the aligner bracket 602 is received by the L-shaped flanges 605 and the alignment feature 606 engages the alignment aperture 603, the aligner bracket 602 is secured to the first housing channel 102*a* using a coupling member (also referred to as 'linking fastener'), such as a screw, rivet, etc., which is inserted through the aligned coupling aperture 607 of the aligner bracket 602 and the coupling aperture 608 of the housing channel's base portion 190. However, one of ordinary skill in the art can understand and appreciate that any other alternate coupling mechanisms can be used to couple the aligner bracket 602 to the housing channel 102*a* without departing from a broader scope of the present disclosure.

In certain example embodiments, the aligner bracket 602 is the same item as the channel cap 108 shown in FIG. 1, which is removed from its position, re-oriented appropriately, and inserted into the L-shaped flanges 605 of the housing channel 102*a* as shown in FIG. 6B. Accordingly, the apertures/screw bosses on each flange 662 of the aligner bracket 602 is functional to couple the aligner bracket 602 to the side walls (191, 192) of the housing channel 102*a* when the aligner bracket 602 is used as a channel cap 108 to cover the open lateral end 601 of the housing channel 102*a*. Even though the present disclosure describes the aligner bracket 602 as being the same item as the channel cap 108, one of ordinary skill in the art can understand and appreciate that in other example embodiments, the aligner bracket 602 and the channel cap 108 may be different items that may or may not have the same shape and/or size without departing from a broader scope of the present disclosure.

Figure 6C:
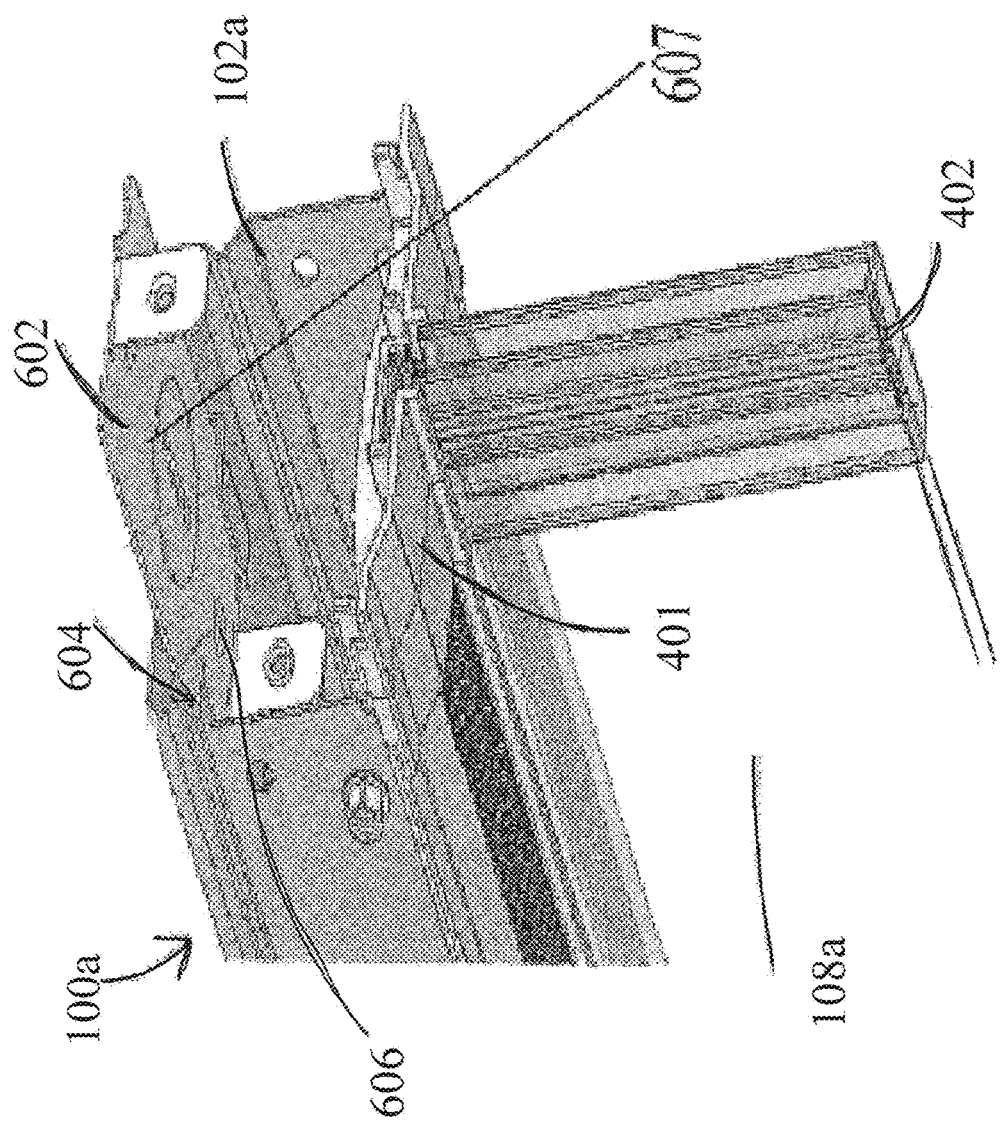
Figure 6D:
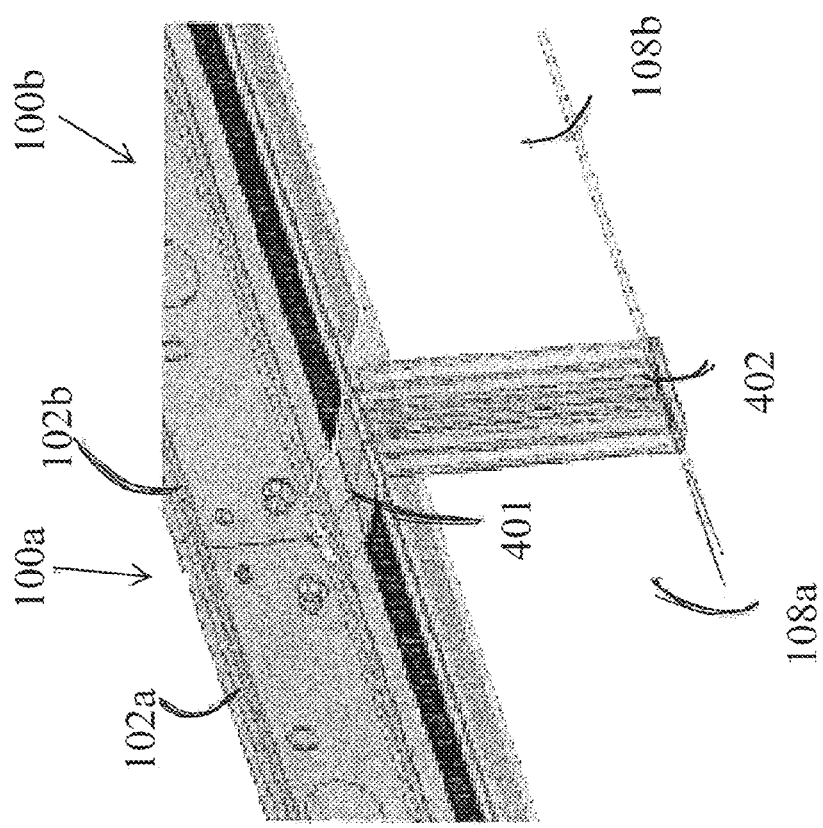

Referring to FIG. 6C, once the aligner bracket 602 is coupled to the housing channel 102*a* of the first lighting fixture 100*a* as described above, the bridge 401 and spacer 402 are added onto the open lateral end 601 of the first housing channel 102*a* and/or the waveguide 106*a*. Subsequently, as illustrated in FIG. 6D, the second lighting fixture 100*b* is joined adjacently to the open lateral end 601 of the first lighting fixture 100*a* via the aligner bracket 602, the bridge 401, and the spacer 402. Specifically, as illustrated in FIG. 6B, once a portion of the aligner bracket 602 is disposed within and coupled to the housing channel 102*a* of the first lighting fixture 100*a*, another portion of the aligner bracket 602 may extend past the first housing channel 102*a*, i.e., outside of the first housing channel 102a through the open lateral end 601. For example, when a portion of the aligner bracket 602 is received by the L-shaped flanges 605, one of the aligner flanges 662 rests within the housing channel 102a, while the other aligner flange 662 that extends from the opposite lateral end of the aligner bracket 602 remain outside the housing channel 102.

To link the first lighting fixture 100a to the second lighting fixture 100b, the extending end of the aligner bracket 602 is inserted into substantially L-shaped flanges 605 in the second housing channel 102b of the second lighting fixture 100b, such that the alignment feature 606 adjacent the second flange 662 of the extending aligner bracket portion engages the alignment aperture 603 of the second housing channel 102b. Then, a linking fastener may be inserted through the aligned other coupling aperture 607 of the aligner bracket 602 and the coupling aperture 608 of the second housing channel 102b to couple the aligner bracket 602 to the second lighting fixture 100b. Further, the second housing channel 102b and second waveguide 106b are coupled to the bridge 401 and spacer 402 adjacent to the first housing channel 102a and/or first waveguide 106a.

In certain example embodiments, when two or more linear edgelit lighting fixtures 100 are joined together, they may be electrically wired together such that one power supply can supply power to all of the linear edgelit lighting fixtures 100. For example, one driver may be coupled to the power supply and the one driver may power each of the linked lighting fixtures. In certain example embodiments, the driver may be internal to the housing channel or external to the lighting fixture. Alternatively, in certain other example embodiments, the linear edgelit lighting fixtures 100 are wired separately and have individual power supplies.

Figure 7:
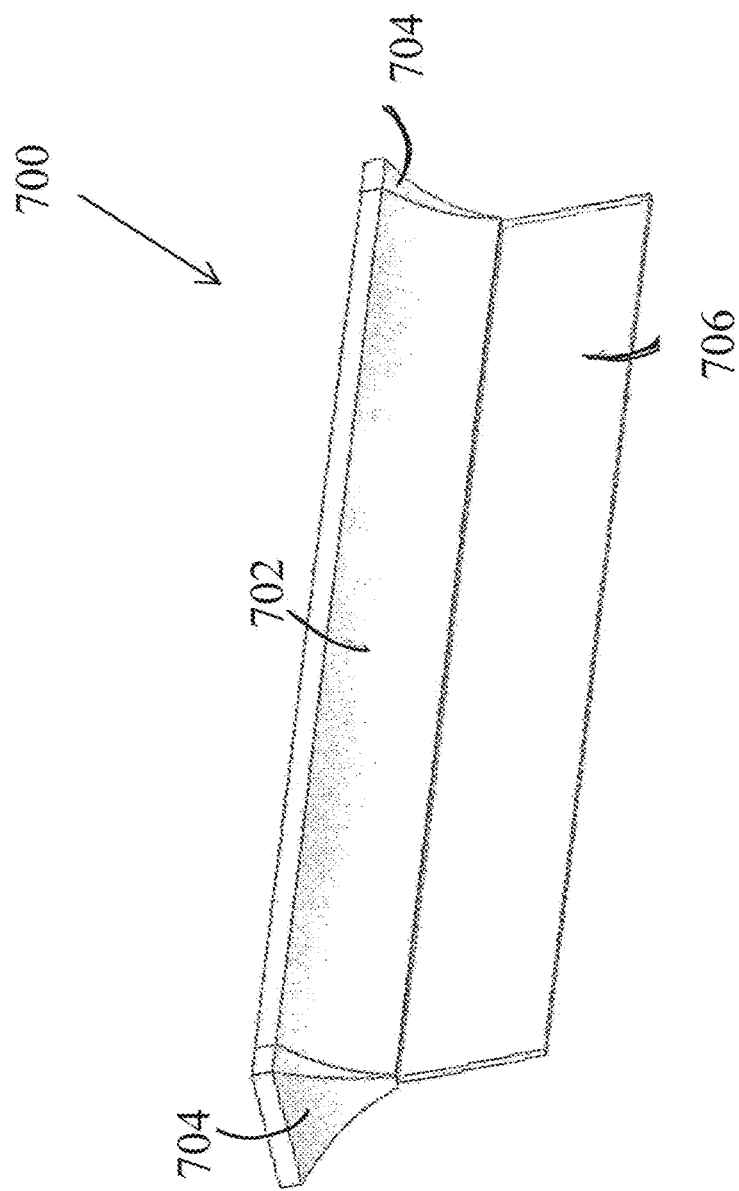
FIG. 7 illustrates a perspective view of yet another linear edgelit lighting fixture, in accordance with example embodiments of the present disclosure.
Figure 8:
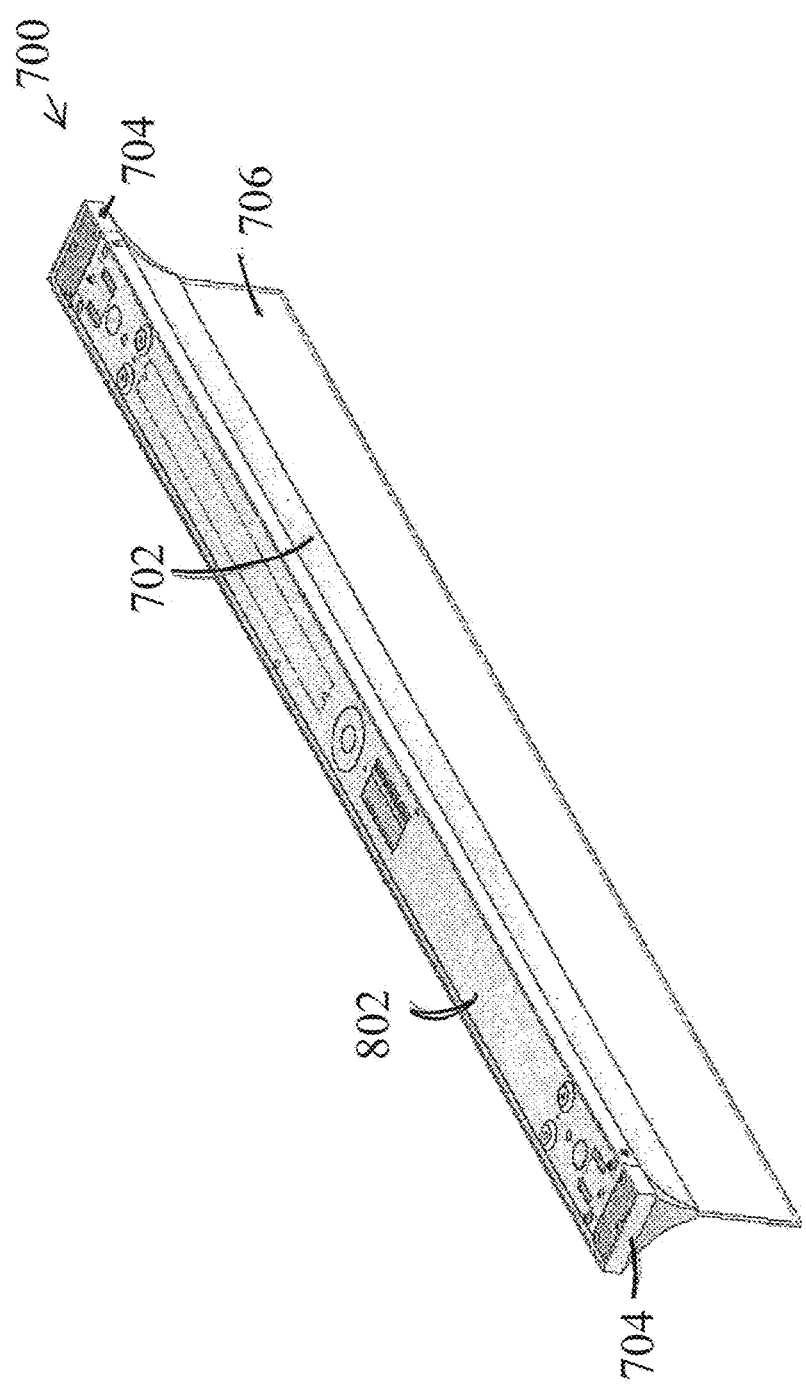
FIG. 8 illustrates a top view of the linear edgelit lighting fixture of FIG. 7, in accordance with example embodiments of the present disclosure.
Figure 9:
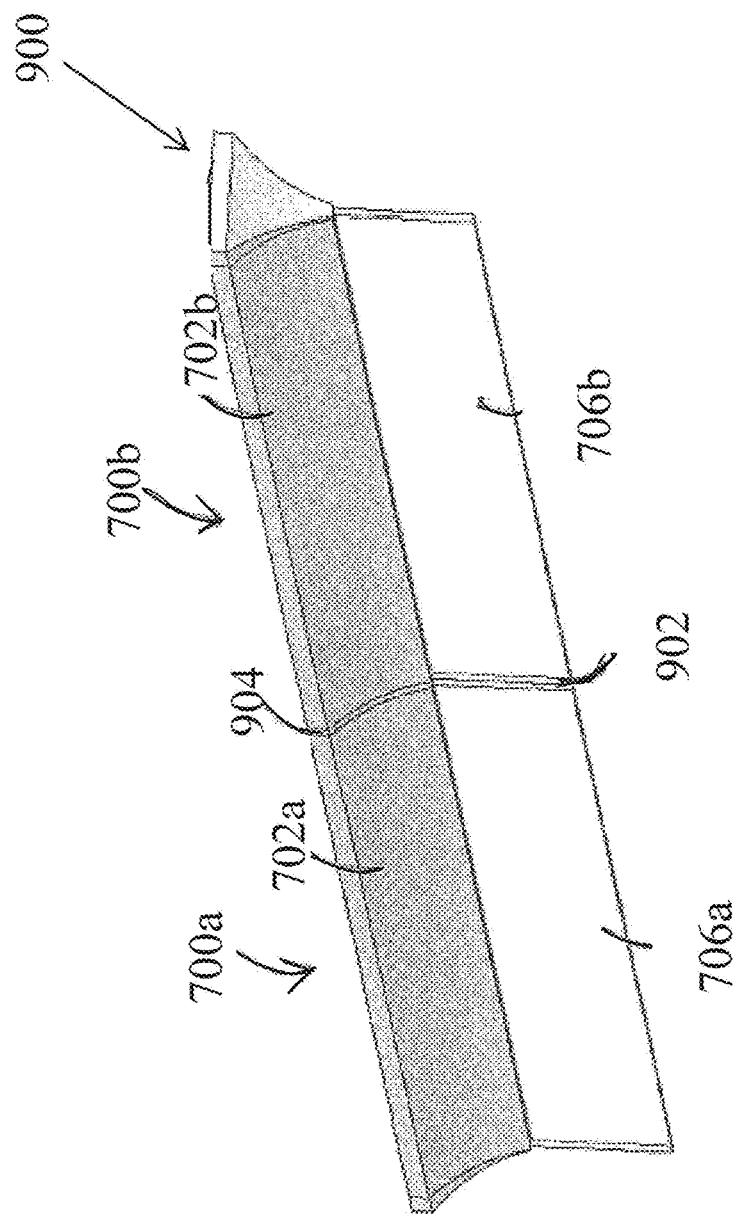
FIG. 9 illustrates a perspective view of two linear edgelit lighting fixtures linked together, in accordance with example embodiments of the present disclosure.
Figure 10:
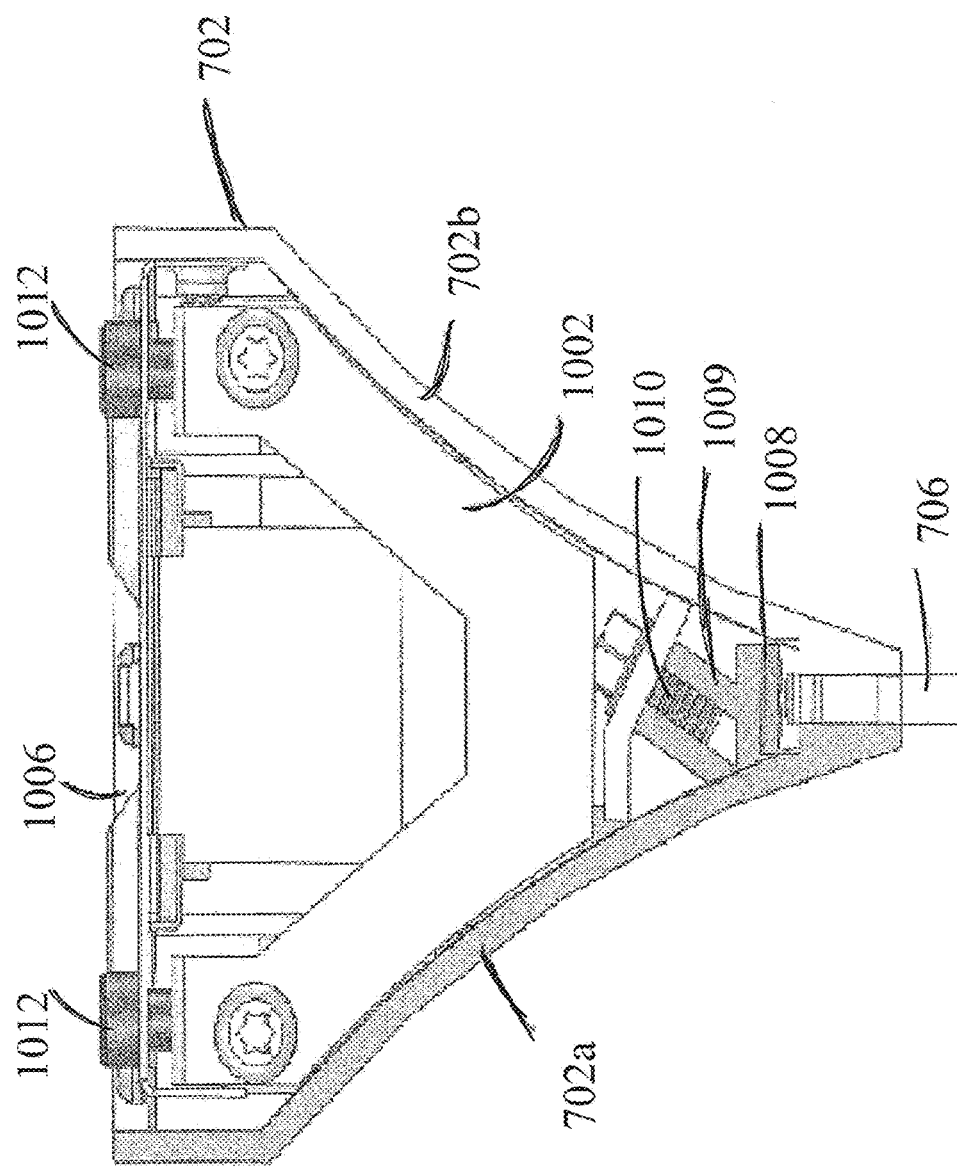
FIG. 10 illustrates an open end view of the linear edgelit lighting fixture of FIG. 7, in accordance with example embodiments of the present disclosure.

Turning to FIGS. 7-10, these figures illustrate different views of another linear edgelit lighting fixture 700, in accordance with example embodiments of the present disclosure. In particular, FIG. 7 illustrates a perspective view of yet another linear edgelit lighting fixture, in accordance with example embodiments of the present disclosure; FIG. 8 illustrates a top view of the linear edgelit lighting fixture of FIG. 7, in accordance with example embodiments of the present disclosure; FIG. 9 illustrates a perspective view of two linear edgelit lighting fixtures linked together, in accordance with example embodiments of the present disclosure; and FIG. 10 illustrates an open end view of the linear edgelit lighting fixture of FIG. 7, in accordance with example embodiments of the present disclosure.

Referring to FIGS. 7-9, the lighting fixture 700 includes a housing channel 702, an edgelit waveguide 706, and endcaps 704. In certain example embodiments, the housing channel 702 may have a tapered linear shape. That is, the housing channel 102 may be a substantially V-shaped structure that includes a first half member 702a and a second half member 702b that join to form the housing channel 702. Further, the housing channel 702 may include a top surface 802 coupled to first and second half members 702a, 702b. The top surface 802 may include a plurality of mounting features, such as surface mounting features, pendant mounting features, cable mounting features, and continuous row mounting features, and so on. The first half member 702a, the second half member 702b, and the top surface 802 in combination may form a V-shaped cavity inside the housing channel 702 to house one or more electronic components associated with the lighting fixtures, e.g., driver 1004.

Specifically, the half members 702a, 702b are placed together such that a coupling clamp feature 1009 (a threaded region) of the first half member 702a is aligned with a coupling aperture of the second half member 702b to receive a fastener, such as a screw 1010 to join the two half members 702a, 702b. When the two half members 702a, 702b are joined together, they may form a LED housing cavity and a waveguide housing cavity. In particular, the waveguide housing cavity is a space between the first half member 702a and the second half member 702b of the housing cavity located at a bottom portion of the housing channel 702, i.e., the narrow end of the V-shaped structure. Once the two halves of the housing channel 702 are joined together, the waveguide 706 may be retained between the first and second half members 702a, 702b in the waveguide housing cavity. Further, the screw 1010 may be tightened to pull the first half member 702a closer to the second half member 702b and increase a retention force on the waveguide 706. This provides stronger and straighter retention of the waveguide 706. The lighting fixture 700 further includes an LED strip 1008 disposed in the LED housing cavity and coupled to a bottom portion of the coupling clamp feature 1009 away from the fastener. In particular, as illustrated in FIG. 10, the LED strip may be disposed above and directed towards an edge (e.g., longitudinal edge) of the waveguide 706. Light from the LEDs that enter the edge of the waveguide 706 may exit the waveguide through the major surfaces of the waveguide as described above in association with FIGS. 1-2. Furthermore, the lighting fixture 700 includes, inter alia, an end bracket 1002, hanger pins 1012, and a surface mounting channel 1006.

As illustrated in FIG. 9, the lighting fixture 700 may be linked to one or more other lighting fixtures 700 to form an assembly 900. In certain example embodiments, the assembly 900 may include spacer 902, 904 that snaps in place and is disposed between the first and second waveguides 706a, 706b, and between the first and second housing channels 702a, 702b of the first lighting fixture 700a and the second lighting fixture 700b. In certain example embodiments, the spacer 902, 904 may reduce/remove a gap formed between the first and second waveguides 706a, 706b and the first and second housing channels 702a, 702b when the first lighting fixture 700a is coupled to the second lighting fixture 700b as described above in association with FIGS. 4-6.

Figure 11:
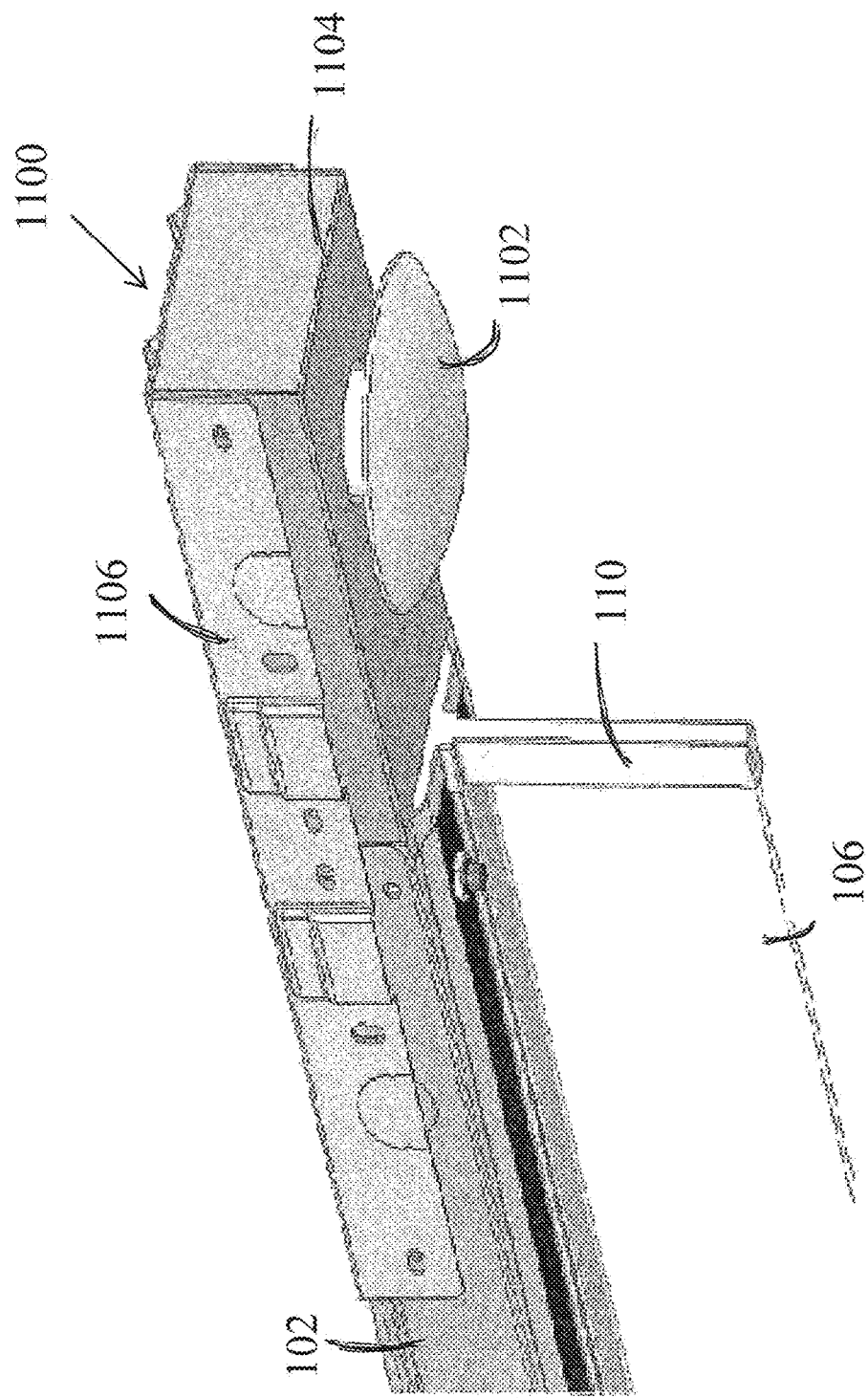
FIG. 11 illustrates a partial view of a linear edgelit lighting fixture having an attached motion sensor, in accordance with example embodiments of the present disclosure.

Turning to FIG. 11, this figure illustrates a partial view of a lighting fixture 1100 having an attached motion sensor 1102, in accordance with example embodiments of the present disclosure. In certain example embodiments, a motion sensor 1102 is attached to the end of the housing channel 102 via a sensor bracket 1106. Specifically, the motion sensor 1102 is attached to a motion sensor housing 1104 which is coupled to the housing channel 102 via the sensor bracket 1106. In particular, the sensor bracket 1106 is disposed above the housing channel 102 of the lighting fixture and the sensor housing 1104 such that a portion of the housing channel 102 and a portion of the sensor housing 1104 that is adjacent to each other is disposed within and coupled to the sensor bracket 1106. However, one of ordinary skill in the art can understand and appreciate that the sensor housing 1104 may be coupled to the lighting fixture 1100 using any other coupling mechanism without departing from a broader scope of the present disclosure. Further, even though FIG. 11 illustrates an elongated U-shaped sensor bracket 1106, one of ordinary skill in the art can understand and appreciate that the sensor bracket 1106 can have any other appropriate shape without departing from a broader scope of the present disclosure. Even though the present disclosure describes the sensor coupled to the lighting fixture as a motion sensor, one of ordinary skill in the art can understand and appreciate that any other appropriate electronic component or sensor (e.g., daylight sensor, occupancy sensor, etc.) can be coupled to the lighting fixture instead of or in addition to the motion sensor without departing from a broader scope of the present disclosure. Further, the sensor 1102 can be positioned at any appropriate place along the lighting fixture and/or the sensor bracket without departing from a broader scope of the present disclosure.

Although the inventions are described with reference to example embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the example embodiments, equivalents of the elements shown therein will suggest themselves to those skilled in the art, and ways of constructing other embodiments of the present invention will suggest themselves to practitioners of the art. Therefore, the scope of the present invention is not limited herein.

What is claimed is:

1. A linear edgelit lighting device, comprising:
    a housing channel;
    a heat sink assembly coupled to the housing channel and comprising a heat sink base and a heat sink clamp that are coupled together to form a light source housing cavity and a waveguide housing cavity that are located substantially at a middle portion of the heat sink assembly,
    a waveguide comprising a first major surface, a second major surface disposed opposite to the first major surface, and an edge disposed between the first major surface and the second major surface, the edge at least partially disposed in the waveguide housing cavity of the heat sink assembly such that the waveguide is substantially perpendicular to the housing channel and the heat sink assembly; and
    one or more light emitting diodes (LEDs) disposed within the light source housing cavity of the heat sink assembly and directed towards the edge of the waveguide such that light emitted by the one or more LEDs enters the waveguide through the edge,
        wherein the heat sink base and the heat sink clamp are coupled together by a fastener disposed at an acute angle relative to one of the first and second major surfaces of the waveguide, the fastener being offset from the middle portion of the heat sink assembly, and
        wherein the fastener is tightened to pull the heat sink clamp against the heat sink base and to exert a horizontal clamping force on the waveguide in order to securely retain the waveguide in the linear edgelit lighting device.

2. The linear edgelit lighting device of claim 1, wherein the housing channel comprises:
    an elongated base portion;
    a plurality of side walls, each extending from opposite longitudinal edges of the base portion and substantially perpendicular to the base portion;
    an open side extending between the plurality of side walls and opposite the base portion; and
    an open lateral end at each end of the housing channel.

3. The linear edgelit lighting device of claim 2, further comprising an end cap disposed over each of the pair of open lateral ends.

4. The linear edgelit lighting device of claim 3, wherein the end cap disposed over at least one of the pair of open lateral ends of the linear edgelit lighting device operates as an alignment bracket that couples the linear edgelit lighting device to a second linear edgelit lighting device when the linear edgelit lighting device is linked to the second linear edgelit lighting device adjacent at least one of the pair of open lateral ends of the linear edgelit lighting device.

5. The linear edgelit lighting device of claim 4, wherein the end cap comprises:
    a substantially rectangular shaped top plate; and
    a pair of flanges, each flange extending perpendicular to the top plate from substantially a middle portion of opposite edges of the top plate,
        wherein the top plate comprises one or more coupling apertures, and a pair of alignment features, each alignment feature adjacent each flange, and wherein each flange comprises one or more apertures.

6. The linear edgelit lighting device of claim 2, wherein the linear edgelit lighting device is configured to couple to a second linear edgelit lighting device adjacent one of the open lateral ends of the linear edgelit lighting device.

7. The linear edgelit lighting device of claim 6, wherein the base portion of the housing channel comprises:
    one or more aligner slots;
    a substantially L-shaped flange extending substantially perpendicular to the base portion and located adjacent each aligner slot;
    an alignment aperture; and
    a coupling aperture.

8. The linear edgelit lighting device of claim 7,
    wherein when the linear edgelit lighting device is coupled to one of the second linear edgelit lighting device,
        a portion of an alignment bracket is received and secured by the substantially L-shaped flanges of the linear edgelit lighting device and another portion of the end cap is received and secured by substantially L-shaped flanges of the second linear edgelit device positioned adjacent the linear edgelit lighting device such that:
            an alignment feature of a pair of alignment features of an end cap engages an alignment aperture of the linear edgelit lighting device and another alignment feature of the pair of alignment features of the end cap engages an alignment aperture of the second linear edgelit lighting device, and
            a first end cap coupling aperture is aligned with a coupling aperture of the linear edgelit lighting fixture and a second end cap coupling aperture is aligned with a coupling aperture of the second linear edgelit lighting fixture,
    wherein a linking fastener is received through each pair of aligned coupling apertures to couple the end cap to the linear edgelit lighting device and the second linear edgelit lighting device and to couple the linear edgelit lighting device to the second linear edgelit lighting device, and
    wherein the alignment bracket is an end cap configured to cover one of the open lateral ends of the linear edgelit lighting device.

9. The linear edgelit lighting device of claim 1, wherein the housing channel forms a cavity that is configured to house one or more electronic components for powering the linear edgelit lighting device.

10. A linear edgelit lighting device comprising:
a housing channel;
a heat sink assembly coupled to the housing channel and comprising a heat sink base and a heat sink clamp that are coupled together to form a light source housing cavity and a waveguide housing cavity that are located substantially at a middle portion of the heat sink assembly,
a waveguide comprising a first major surface, a second major surface disposed opposite to the first major surface, and an edge disposed between the first major surface and the second major surface, the edge at least partially disposed in the waveguide housing cavity of the heat sink assembly such that the waveguide is substantially perpendicular to the housing channel and the heat sink assembly; and
one or more light emitting diodes (LEDs) disposed within the light source housing cavity of the heat sink assembly and directed towards the edge of the waveguide such that light emitted by the one or more LEDs enters the waveguide through the edge,
wherein the heat sink base and the heat sink clamp are coupled together by a fastener disposed at an acute angle relative to one of the first and second major surfaces of the waveguide, the fastener being offset from the middle portion of the heat sink assembly,
wherein the fastener is tightened to pull the heat sink clamp against the heat sink base and to exert a horizontal clamping force on the waveguide in order to securely retain the waveguide in the linear edgelit lighting device,
wherein the housing channel comprises:
an elongated base portion;
a plurality of side walls, each extending from opposite longitudinal edges of the base portion and substantially perpendicular to the base portion;
an open side extending between the plurality of side walls and opposite the base portion; and
an open lateral end at each end of the housing channel, and
wherein at least one of the open lateral ends of the housing channel is coupled to an open lateral end of a second linear edgelit lighting device, the second linear edgelit lighting device comprising one or more second LEDs and a second waveguide.

11. The linear edgelit lighting device of claim 10, wherein the one or more LEDs of the linear edgelit lighting device and the one or more second LEDs of the second linear edgelit lighting device are powered by a same power source.

12. The linear edgelit lighting device of claim 10, wherein a waveguide spacer is disposed between the waveguide of the linear edgelit lighting device and the second waveguide of the second linear edgelit lighting device such that the waveguide spacer overlaps a latitudinal edge of the waveguide on one end and a latitudinal edge of the second waveguide on a second opposite end, wherein the edge of the waveguide through which light emitted by the one or more LEDs enters is a longitudinal edge.

13. A lighting system comprising:
a first lighting fixture comprising:
a first elongated housing channel having a pair of first open lateral ends opposite to each other and adjacent a respective lateral edge of the first elongated housing channel;
a pair of first end caps, each first end cap disposed at a respective first open lateral end to cover the respective first open lateral end;
a first light emitting diode (LED) strip coupled to the first elongated housing channel and comprising a plurality of LEDs; and
a first waveguide coupled to the first elongated housing channel such that light emitted from the plurality of LEDs of the first LED strip enters the first waveguide through an edge of the first waveguide; and
a second lighting fixture comprising: a second housing channel having a pair of second open lateral ends opposite to each other and adjacent a respective lateral edge of the second housing channel; a second light emitting diode (LED) strip coupled to the second elongated housing channel and comprising a plurality of LEDs; and a second waveguide coupled to the second elongated housing channel such that light emitted from the plurality of LEDs of the second LED strip enters the second waveguide through an edge of the second waveguide,
wherein the first lighting fixture is coupled to the second lighting fixture such that one first open lateral end of the first elongated housing channel is adjacent one second open lateral end of the second housing channel, and
wherein at least one of the pair of first end caps is configured to operate as an alignment bracket to couple the first lighting fixture to the second lighting fixture such that a portion of the at least one of the pair of first end caps is coupled to the first elongated housing channel and another portion of the at least one of the pair of first end caps is coupled to the second housing channel.

14. The lighting system of claim 13,
wherein the first elongated housing channel further comprises a first elongated base portion,
wherein the second elongated housing channel further comprises a second elongated base portion, and
wherein each of the first elongated base portion and the second elongated base portion comprises:
one or more aligner slots;
a substantially L-shaped flange extending substantially perpendicular to the base portion and located adjacent each aligner slot;
an alignment aperture; and
a coupling aperture.

15. The lighting system of claim 14,
wherein the at least one of the pair of first end caps comprises:
a top plate, and
a pair of flanges, each flange extending perpendicular to the top plate from substantially a middle portion of opposite edges of the top plate,
wherein the top plate comprises one or more coupling apertures, and a pair of alignment features, each alignment feature adjacent each flange, and wherein each flange comprises one or more apertures.

16. The lighting system of claim 15,
wherein a portion of the top plate comprising a first flange of the pair of flanges engages a pair of the substantially L-shaped flanges of the first lighting fixture,
wherein a portion of the top plate comprising a second flange of the pair of flanges engages a pair of the substantially L-shaped flanges of the second lighting fixture.

17. The lighting system of claim 16,
wherein the top plate of the at least one of the pair of first end caps engages the pair of substantially L-shaped flanges of the first lighting fixture and the second lighting fixture such that:
- one of the pair of alignment features of the at least one of the pair of first end caps engages the alignment aperture of the first lighting fixture and another one of the pair of alignment features of the at least one of the pair of first end caps engages the alignment aperture of the second lighting fixture, and
- one of the one or more coupling apertures of the at least one of the pair of first end caps is aligned with a coupling aperture of the first lighting fixture and another of the one or more coupling apertures of the at least one of the pair of first endcaps is aligned with a coupling aperture of the second lighting fixture, and wherein the pair of aligned coupling apertures are configured to receive a linking fastener therethrough to couple the least one of the pair of first end caps to the first lighting fixture and the second lighting fixture and to couple the first lighting fixture to the second lighting fixture.

18. The lighting system of claim 13, wherein a waveguide spacer is disposed between the first waveguide of the first lighting fixture and the second waveguide of the second lighting fixture such that the waveguide spacer overlaps a latitudinal edge of the first waveguide on one end of the waveguide spacer and a latitudinal edge of the second waveguide on a second opposite end of the waveguide spacer.

19. The lighting system of claim 13, wherein each of the first lighting fixture and the second lighting fixture further comprises a heat sink assembly configured to securely retain the first waveguide to the first lighting fixture and the second waveguide to the second lighting fixture, respectively.

20. The lighting system of claim 19,
wherein the heat sink assembly comprises a heat sink base and a heat sink clamp that are coupled together via a fastener that is disposed at an acute angle relative to the respective waveguide, and
wherein the fastener is tightened to pull the heat sink clamp against the heat sink base and to exert a horizontal clamping force onto the respective waveguide in order to securely retain the respective waveguide in the respective lighting fixture.

\* \* \* \* \*